US012530629B2

(12) United States Patent
Wang et al.

(10) Patent No.: US 12,530,629 B2
(45) Date of Patent: Jan. 20, 2026

(54) METHOD FOR CONSTRUCTING SUPPORT VECTOR MACHINE OF NONPARALLEL STRUCTURE

(71) Applicant: Dalian Minzu University, Dalian (CN)

(72) Inventors: Liguo Wang, Dalian (CN); Guangxin Liu, Dalian (CN); Ying Xiao, Dalian (CN); Danfeng Liu, Dalian (CN); Haitao Liu, Dalian (CN)

(73) Assignee: Dalian Minzu University, Dalian (CN)

( * ) Notice: Subject to any disclaimer, the term of this patent is extended or adjusted under 35 U.S.C. 154(b) by 804 days.

(21) Appl. No.: 17/901,895

(22) Filed: Sep. 2, 2022

(65) Prior Publication Data

US 2023/0351267 A1    Nov. 2, 2023

(30) Foreign Application Priority Data

Apr. 18, 2022  (CN) .......................... 202210401847.5

(51) Int. Cl.
*G06N 20/10*  (2019.01)
*G06F 18/2411*  (2023.01)
*G06V 10/766*  (2022.01)
*G06V 20/10*  (2022.01)

(52) U.S. Cl.
CPC ......... *G06N 20/10* (2019.01); *G06F 18/2411* (2023.01); *G06V 10/766* (2022.01); *G06V 20/194* (2022.01)

(58) Field of Classification Search
CPC ........ G06N 20/00; G06N 20/10; G06N 20/20; G06F 18/2411; G06V 10/766; G06V 20/194

See application file for complete search history.

(56) References Cited

U.S. PATENT DOCUMENTS

| 2005/0060295 A1* | 3/2005 | Gould ................. H04L 63/1425 |
| 2008/0177680 A1* | 7/2008 | Laxman ................. G06N 20/10 706/12 |

* cited by examiner

*Primary Examiner* — Shane D Woolwine
(74) *Attorney, Agent, or Firm* — Addison D. Ault; IPGentleman Intellectual Property Services, LLC (57) ABSTRACT

A method for constructing a support vector machine of a nonparallel structure is provided. On the basis of a traditional parallel support vector machine (SVM), a least square term of samples is added, an additional empirical risk minimization term and an offset constraint term are added to an original optimization problem, so as to obtain two nonparallel hyperplanes respectively, and a new nonparallel support vector machine with additional empirical risk minimization is formed. The method includes: preprocessing data, solving a Lagrange multiplier of a positive-class hyperplane, solving a Lagrange multiplier of a negative-class hyperplane, solving parameters of positive-class and negative-class hyperplanes, and determining a class of a new data point. Through the new method, a new nonparallel vector machine algorithm is proposed to further improve classification accuracy of hyperspectral images on the basis of the algorithm itself, so as to obtain better classification performance.

12 Claims, 2 Drawing Sheets

METHOD FOR CONSTRUCTING SUPPORT VECTOR MACHINE OF NONPARALLEL STRUCTURE

CROSS REFERENCE TO THE RELATED APPLICATIONS

This application is based upon and claims priority to Chinese Patent Application No. 202210401847.5, filed on Apr. 18, 2022, the entire contents of which are incorporated herein by reference.

TECHNICAL FIELD

The present disclosure relates to the technical field of machine learning, and in particular to a method for constructing a support vector machine of a nonparallel structure.

BACKGROUND

A support vector machine (SVM) has been proposed by Vapnik, etc., and is suitable for pattern recognition and other fields. The SVM is characterized by considering both an empirical risk and a structural risk, that is, supervised learning is realized by finding a hyperplane that can ensure classification accuracy and maximize an interval between two types of data. With some desirable characteristics, such as kernel tricks, sparsity and global solutions, the SVM is widely used in remote sensing image classification because of its solid theoretical basis and desirable generalization. The premise of a support vector machine classification model is assuming that boundaries of positive and negative classes are parallel. However, for actual remote sensing data, the assumption is difficult to establish, which affects generalization ability of the model. Jayadeva, etc. have proposed a twin support vector machine (TWSVM) to solve the problem. The TWSVM aims to find a pair of nonparallel hyperplanes (a parallel state can be regarded as a special nonparallel state). Data points of each class are close to one of the two nonparallel hyperplanes and far away from the other. Classes of samples are determined by comparing distances between the samples and the two hyperplanes. The TWSVM is especially successful but still has obvious shortcomings: a TWSVM model only considers an empirical risk without a structural risk, and its generalization performance is affected, so that its classification effect is not as good as that of a traditional support vector machine in many cases. Therefore, the TWSVM is not effective in hyperspectral image classification directly. A new nonparallel vector machine algorithm is proposed herein, so as to further improve classification accuracy of hyperspectral images on the basis of the algorithm itself.

In view of the above situation, based on a traditional parallel support vector machine, a nonparallel support vector machine model is constructed herein, that is, an additional empirical risk minimization nonparallel support vector machine (AERM-NSVM), by adding a least square term of samples and an additional empirical risk minimization term, which is referred to as the patent method hereinafter.

SUMMARY

An objective of the present disclosure is to provide a method for constructing a support vector machine of a nonparallel structure, and a new nonparallel vector machine algorithm is proposed to further improve classification accuracy of hyperspectral images on the basis of the algorithm itself, so as to obtain better classification performance.

To achieve the objective, the present disclosure provides the method for constructing a support vector machine of a nonparallel structure. The method includes:
S1, preprocessing data;
S2, solving a Lagrange multiplier of a positive-class hyperplane;
S3, solving a Lagrange multiplier of a negative-class hyperplane;
S4, solving parameters of positive-class and negative-class hyperplanes; and
S5, determining a class of a new data point.

Preferably, the preprocessing data in S1 specifically includes:
(1) reading m n-dimensional training data sets of two classes, conducting standardization, obtaining a training data sample matrix C of m×n, and reading label information as a vector y;
(2) distinguishing training samples according to positive and negative label information to obtain a matrix A of $m_+ \times n$ and a matrix B of $m_- \times n$; and
(3) converting a label term y into a diagonal matrix Y.

Preferably, the solving a Lagrange multiplier of a positive-class hyperplane in S2 specifically includes:
(1) constructing a unit vector $I_+$ of $m_+$ dimensions, and obtaining a matrix $P_+$ by means of a formula (1);

$$P_+ = \begin{bmatrix} AA^T + \frac{1}{c_1}I_+ & -AC^TY^T \\ -YCA^T & YCC^TY^T \end{bmatrix}; \quad (1)$$

(2) constructing an all-ones vector e of m dimensions, and obtaining a matrix $Q_+$ by means of a formula (2):

$$Q_+ = -e^T \quad (2);$$

(3) constructing a unit matrix I of m dimensions, and obtaining a matrix $H_+$ by means of a formula (3);

$$H_+ = \begin{bmatrix} -1 \times I \\ I \end{bmatrix}; \quad (3)$$

(4) obtaining a matrix $J_+$ by means of a formula (4);

$$J_+ = [C_3 \times e^T] \quad (4);$$

(5) constructing an all-ones vector $e_+$ of $m_+$ dimensions, and obtaining a matrix $K_+$ by means of a formula (5);

$$K_+ = \begin{bmatrix} e_+^T \\ -e^TY^T \end{bmatrix}; \quad (5)$$

and
(6) obtaining vectors $\alpha = (\alpha_1, \ldots, \alpha_m)$ and $\lambda = (\lambda_1, \ldots, \lambda_{m_+})$ of the Lagrange multiplier by means of a formula (6);

$$\min_\mu \frac{1}{2}[\lambda^T \ \alpha^T]^T P_+[\lambda^T \ \alpha^T] + Q_+[\lambda^T \ \alpha^T] \quad (6)$$

$$\text{s.t. } K_+^T[\lambda^T \ \alpha^T] = 0$$

$$0 \leq [\lambda^T \ \alpha^T] \leq J_+, i = 1, \ldots, n;$$

If $P_+$ is obtained by Equation $$P_+ \begin{bmatrix} AA^T + \frac{1}{c_1}I_+ + E_1 & -(AC^T + E_2)Y^T \\ -Y(CA^T + E_3) & E(CC^T + E_4)Y^T \end{bmatrix} \quad (7)$$

At this time, obtaining vectors $\alpha=(\alpha_1, \ldots, \alpha_{m_+})$ and $\lambda=(\lambda, \ldots, \lambda_{m_+})$ of the Lagrange multiplier by means of a formula (8);

$$\min_\mu \frac{1}{2}[\lambda^T \ \alpha^{T^T}]^T P_+ [\lambda^T \ \alpha^T] + Q_+[\lambda^T \ \alpha^T] \quad (8)$$

$$\text{s.t.} \ 0 \le [\lambda^T \ \alpha^T] \le J_+, i = 1, \ldots, n.$$

Preferably, the solving a Lagrange multiplier of a negative-class hyperplane in S3 specifically includes:
(1) constructing a unit matrix $I_-$ of $m_-$ dimensions, and obtaining a matrix $P_-$ by means of a formula (9);

$$P_- = \begin{bmatrix} AA^T + \frac{1}{c_1}I_+ & -AC^TY^T \\ -YCA^T & YCC^TY^T \end{bmatrix}; \quad (9)$$

(2) constructing an all-ones vector e of m dimensions, and obtaining a matrix $Q_-$ by means of a formula (10);

$$Q_- = -e^T \quad (10);$$

(3) obtaining a matrix $H_-$ by means of a formula (11);

$$H_- = \begin{bmatrix} -1 \times I \\ I \end{bmatrix}; \quad (11)$$

(4) obtaining a matrix $J_-$ by means of a formula (12);

$$J_- = [C_4 \times e^T] \quad (12);$$

(5) constructing an all-ones vector $e_-$ of $m_-$ dimensions, and obtaining a matrix $K_-$ by means of a formula (13);

$$K_- = \begin{bmatrix} e_-^T \\ e^T Y^T \end{bmatrix}; \quad (13)$$

and
(6) obtaining vectors $\theta=(\theta_1, \ldots, \theta_m)$ and $\gamma=(\gamma_1, \ldots, \gamma_{m_-})$ of the Lagrange multiplier by means of a formula (14);

$$\min_\mu \frac{1}{2}[\theta^T \ \gamma^T]^T P_-[\theta^T \ \gamma^T] + \theta[\theta^T \ \gamma^T] \quad (14)$$

$$\text{s.t.} \ K_-^T[\theta^T \ \gamma^T] = 0$$

$$0 \le [\theta^T \ \gamma^T] \le J_-, i = 1, \ldots, n;$$

If $P_-$ is obtained by Equation (15).

$$P_- = \begin{bmatrix} BB^T + \frac{1}{c_2}I_- + F_1 & (BC^T + F_2)Y^T \\ Y(CB^T + F_3) & Y(CC^T + F_4)Y^T \end{bmatrix} \quad (15)$$

At this time, obtaining vectors $\theta=(\theta_1, \ldots, \theta_n)$ and $\gamma=(\gamma_1, \ldots, \gamma_{m_-})$ of the Lagrange multiplier by means of a formula (16);

$$\min_\mu \frac{1}{2}[\theta^T \gamma^T]^T P_-[\theta^T \gamma^T] + Q_-[\theta^T \gamma^T] \quad (16)$$

$$\text{s.t.} \ 0 \le [\theta^T \gamma^T] \le J_-, i = 1, \ldots, n.$$

Preferably, the solving parameters of positive-class and negative-class hyperplanes in S4 specifically includes:
(1) obtaining a normal vector $\omega_+$ of a positive-class hyperplane by means of a formula (17);

$$\omega_+ = -A^T\lambda + C^TY^T\alpha \quad (17);$$

(2) obtaining an offset $b_+$ of the positive-class hyperplane by means of a formula (18);

$$b_+ = \frac{e_+^T\left(-A\omega_+ + \frac{1}{c_1}\lambda\right)}{m_+} - 1; \quad (18)$$

(3) obtaining a normal vector $\omega_-$ of a negative-class hyperplane by means of a formula (19);

$$\omega_- = B^T\theta + C^TY^T\gamma \quad (19); \text{ and}$$

(4) obtaining an offset $b_-$ of the negative-class hyperplane by means of a formula (20);

$$b_- = \frac{e_-^T\left(-B\omega_- - \frac{1}{c_2}\gamma\right)}{m_-} + 1. \quad (20)$$

If the Lagrange multipliers are obtained by Equation (7), the solving parameters of positive-class and negative-class hyperplanes in S4 specifically includes:
(1) obtaining a normal vector $\omega_+$ of a positive-class hyperplane by means of a formula (21);

$$\omega_+ = -A^T\lambda + C^TY^T\alpha \quad (21);$$

(2) obtaining an offset $b_+$ of the positive-class hyperplane by means of a formula (22);

$$b_+ = -e_+^T\lambda + e^TY^T\alpha - 1; \quad (22)$$

(3) obtaining a normal vector $\omega_-$ of a negative-class hyperplane by means of a formula (23);

$$\omega_- = B^T\theta + C^TY^T\gamma \quad (23); \text{ and}$$

(4) obtaining an offset $b_-$ of the negative-class hyperplane by means of a formula (24);

$$b_- = e_-^T\theta + e^TY^T\gamma + 1 \quad (24).$$

Preferably, the determining a class of a new data point in S5 specifically includes:
(1) acquiring test data x, and obtaining an Euclidean distance between x and a positive-class hyperplane by means of a formula (25);

$$d_+ = \frac{|(x^T \cdot \omega_+) + b_+|}{d_+}; \quad (25)$$

(2) obtaining an Euclidean distance between x and a negative-class hyperplane by means of a formula (26);

$$d_- = \frac{|(x^T \cdot \omega_-) + b_-|}{d_-};\quad(26)$$

and (3) determining which one of $d_+$ and $d_-$ is smaller, where x is in a positive class in response to determining $d_+ < d_-$, and otherwise in a negative class.

Preferably, construction methods are conducted in a linear manner, and under the condition that the methods are used in a nonlinear case, expansion modes of the methods are consistent with that of a parallel support vector machine (SVM); and according to description of a case of two classes, under the condition that the methods are used in a multi-class case, the expansion modes of the methods are consistent with that of the parallel SVM.

Therefore, through the method for constructing a support vector machine of a nonparallel structure of the present disclosure, a new nonparallel vector machine algorithm is proposed to further improve classification accuracy of hyperspectral images on the basis of the algorithm itself, so as to obtain better classification performance.

The technical solution of the present disclosure will be further described in detail below with reference to the accompanying drawings and the embodiments.

BRIEF DESCRIPTION OF THE DRAWINGS

FIGS. 2A-2D are images of a Pavia Center hyperspectral image classification result, where FIG. 2A is ground truth, FIG. 2B is a support vector machine (SVM), FIG. 2C is a twin support vector machine (TWSVM), and FIG. 2D is the method of the present disclosure; and FIGS. 3A-3D are images of a Pavia University hyperspectral image classification result, where FIG. 3A is ground truth, FIG. 3B is SVM, FIG. 3C is TWSVM, and FIG. 3D is the method of the present disclosure.

DETAILED DESCRIPTION OF THE EMBODIMENTS

The technical solution of the present disclosure will be further described below with reference to the accompanying drawings and the embodiments.

Embodiment 1

The present disclosure provides a method for constructing a support vector machine of a nonparallel structure. The method includes:

S1, data is preprocessed, specifically, (1) m n-dimensional training data sets of two classes are read, standardization is conducted, a training data sample matrix C of m×n is obtained, and label information is read as a vector y;

(2) training samples are distinguished according to positive and negative label information to obtain a matrix A of $m_+ \times n$ and a matrix B of $m_- \times n$; and (3) a label term y is converted into a diagonal matrix Y.

S2, a Lagrange multiplier of a positive-class hyperplane is solved, specifically, (1) a unit vector $I_+$ of $m_+$ dimensions is constructed, and a matrix $P_+$ is obtained by means of a formula (1);

$$P_+ = \begin{bmatrix} AA^T + \frac{1}{c_1}I_+ & -AC^TY^T \\ -YCA^T & YCC^TY^T \end{bmatrix};\quad(1)$$

(2) an all-ones vector e of m dimensions is constructed, and a matrix $Q_+$ is obtained by means of a formula (2);

$$Q_+ = -e^T \quad(2);$$

(3) a unit matrix I of m dimensions is constructed, and a matrix $H_+$ is obtained by means of a formula (3);

$$H_+ = \begin{bmatrix} -1 \times I \\ I \end{bmatrix};\quad(3)$$

(4) a matrix $J_+$ is obtained by means of a formula (4);

$$J_+ = [C_3 \times e^T] \quad(4);$$

(5) an all-ones vector e, of m, dimensions is constructed, and a matrix $K_+$ is obtained by means of a formula (5);

$$K_+ = \begin{bmatrix} e_+^T \\ -e^TY^T \end{bmatrix};\quad(5)$$

and (6) vectors $\alpha = (\alpha_1, \ldots, \alpha_m)$ and $\lambda = (\lambda_1, \ldots, \lambda_{m_-})$ of the Lagrange multiplier are obtained by means of a formula (6);

$$\min_\mu \frac{1}{2}[\lambda^T \alpha^T]^T P_+ [\lambda^T \alpha^T] + Q_+[\lambda^T \alpha^T] \quad(6)$$

$$\text{s.t. } K_+^T[\lambda^T \alpha^T] = 0$$

$$0 \leq [\lambda^T \alpha^T] \leq J_+, i = 1, \ldots, n;$$

S3, a Lagrange multiplier of a negative-class hyperplane is solved, specifically, (1) a unit matrix $I_-$ of $m_-$ dimensions is constructed, and a matrix $P_-$ is obtained by means of a formula (7);

$$P_- = \begin{bmatrix} AA^T + \frac{1}{c_1}I_+ & -AC^TY^T \\ -YCA^T & YCC^TY^T \end{bmatrix};\quad(7)$$

(2) an all-ones vector e of m dimensions is constructed, and a matrix $Q_-$ is obtained by means of a formula (8);

$$Q_- = -e^T \quad(8);$$

(3) a matrix $H_-$ is obtained by means of a formula (9);

$$H_- = \begin{bmatrix} -1 \times I \\ I \end{bmatrix}; \tag{9}$$

(4) a matrix $J_-$ is obtained by means of a formula (10);

$$J_- = [C_4 \times e^T] \tag{10};$$

(5) an all-ones vector $e_-$ of $m_-$ dimensions is constructed, and a matrix $K_-$ is obtained by means of a formula (11);

$$K_- = \begin{bmatrix} e_-^T \\ e_-^T Y^T \end{bmatrix}; \tag{11}$$

and (6) vectors $\theta=(\theta_1, \ldots, \theta_{m_-})$ and $\gamma=(\gamma_1, \ldots, \gamma_{m_-})$ of the Lagrange multiplier are obtained by means of a formula (12);

$$\min_\mu \frac{1}{2}[\theta^T \gamma^T]^T P_-[\theta^T \gamma^T] + Q_-[\theta^T \gamma^T] \tag{12}$$

$$\text{s.t. } K_-^T[\theta^T \gamma^T] = 0$$

$$0 \leq [\theta^T \gamma^T] \leq J_-, i = 1, \ldots, n;$$

S4, parameters of positive and negative-class hyperplanes are solved, specifically, (1) a normal vector $\omega_+$ of a positive-class hyperplane is obtained by means of a formula (13);

$$\omega_+ = -A^T\lambda + C^T Y^T \alpha \tag{13};$$

(2) an offset $b_+$ of the positive-class hyperplane is obtained by means of a formula (14);

$$b_+ = \frac{e_+^T\left(-A\omega_+ + \frac{1}{c_1}\lambda\right)}{m_+} - 1; \tag{14}$$

(3) a normal vector $\omega_-$ of a negative-class hyperplane is obtained by means of a formula (15);

$$\omega_- = B^T\theta + C^T Y^T \gamma \tag{15}; \text{ and}$$

(4) an offset $b_-$ of the negative-class hyperplane is obtained by means of a formula (16);

$$b_- = \frac{e_-^T\left(-B\omega_- - \frac{1}{c_2}\gamma\right)}{m_-} + 1. \tag{16}$$

S5, a class of a new data point is determined, specifically, (1) test data x is acquired, and an Euclidean distance between x and a positive-class hyperplane is obtained by means of a formula (17);

$$d_+ = \frac{|(x^T \cdot \omega_+) + b_+|}{d_+}; \tag{17}$$

(2) an Euclidean distance between x and a negative-class hyperplane is obtained by means of a formula (18);

$$d_- = \frac{|(x^T \cdot \omega_-) + b_-|}{d_-}; \tag{18}$$

and (3) which one of $d_+$ and $d_-$ is smaller is determined, where x is in a positive class in response to determining $d_+ < d_-$, and otherwise in a negative class.

Embodiment 2

The present disclosure provides a method for constructing a support vector machine of a nonparallel structure. The method includes:

S1, data is preprocessed, specifically,
(1) m n-dimensional training data sets of two classes are read, and standardization is conducted; and a training data sample matrix C of m×n is obtained, and label information is read as a vector y;
(2) training samples are distinguished according to positive and negative label information to obtain a matrix A of $m_+ \times n$ and a matrix B of $m_- \times n$; and
(3) a label term y is converted into a diagonal matrix Y.

S2, a Lagrange multiplier of a positive-class hyperplane is solved, specifically,
(1) a unit vector $I_+$ of $m_+$ dimensions is constructed, and a matrix $P_+$ is obtained by means of a formula (1);

$$P_+ = \begin{bmatrix} AA^T + \frac{1}{c_1}I_+ + E_1 & -(AC^T + E_2)Y^T \\ -Y(CA^T + E_3) & Y(CC^T + E_4)Y^T \end{bmatrix}; \tag{1}$$

(2) a matrix $Q_+$ is obtained by means of a formula (2);

$$Q_- = -e^T \tag{2};$$

(3) a unit matrix I of m dimensions is constructed, and a matrix $H_+$ is obtained by means of a formula (3);

$$H_+ = \begin{bmatrix} -1 \times I \\ I \end{bmatrix}; \tag{3}$$

(4) an all-ones vector e of m dimensions is constructed, and a matrix $J_+$ is obtained by means of a formula (4);

$$J_+ = [C_3 \times e^T] \tag{4}; \text{ and}$$

(5) vectors $\alpha=(\alpha_1, \ldots, \alpha_m)$ and $\lambda=(\lambda_1, \ldots, \lambda_m)$ of the Lagrange multiplier are obtained by means of a formula (5);

$$\min_\mu \frac{1}{2}[\lambda^T \ \alpha^T]^T P_+[\lambda^T \ \alpha^T] + Q_+[\lambda^T \ \alpha^T] \tag{5}$$

$$\text{s.t. } 0 \leq [\lambda^T \alpha^T] \leq J_+, i = 1, \ldots, n.$$

S3, a Lagrange multiplier of a negative-class hyperplane is solved, specifically,
(1) a unit matrix $I_-$ of $m_-$ dimensions is constructed, and a matrix $P_-$ is obtained by means of a formula (6);

$$P_- = \begin{bmatrix} BB^T + \frac{1}{c_2}I_- + F_1 & -(BC^T + F_2)Y^T \\ Y(CB^T + F_3) & Y(CC^T + F_4)Y^T \end{bmatrix}; \tag{6}$$

(2) a matrix $Q_-$ is obtained by means of a formula (7);

$$Q_- = -e^T \quad (7);$$

(3) a matrix $H_-$ is obtained by means of a formula (8);

$$H_- = \begin{bmatrix} -1 \times I \\ I \end{bmatrix}; \quad (8)$$

(4) an all-ones vector e of m dimensions is constructed, and a matrix J is obtained by means of a formula (9);

$$J_- = [C_4 \times e^T] \quad (9); \text{ and}$$

(5) vectors $\theta = (\theta_1, \ldots, \theta_{m_-})$ and $\gamma = (\gamma_1, \ldots, \gamma_{m_-})$ of the Lagrange multiplier are obtained by means of a formula (10);

$$\min_\mu \frac{1}{2} [\theta^T \ \gamma^T]^T P_- [\theta^T \ \gamma^T] + Q_- [\theta^T \ \gamma^T] \quad (10)$$

$$\text{s.t. } 0 \leq [\theta^T \gamma^T] \leq J_-, i = 1, \ldots, n.$$

S4, parameters of positive-class and negative-class hyperplanes are solved, specifically.

(1) a normal vector $\omega_+$ of a positive-class hyperplane is obtained by means of a formula (11);

$$\omega_+ = -A^T \lambda + C^T Y^T \alpha \quad (11);$$

(2) an offset $b_+$ of the positive-class hyperplane is obtained by means of a formula (12);

$$b_+ = -e_+^T \lambda + e^T Y^T \alpha - 1; \quad (12)$$

(3) a normal vector $\omega_-$ of a negative-class hyperplane is obtained by means of a formula (13);

$$\omega_- = B^T \theta + C^T Y^T \gamma \quad (13); \text{ and}$$

(4) an offset $b_-$ of the negative-class hyperplane is obtained by means of a formula (14);

$$b_- = e_-^T \theta + e^T Y^T \gamma + 1 \quad (14).$$

S5, a class of a new data point is determined, specifically.

(1) test data x is acquired, and an Euclidean distance between x and a positive-class hyperplane is obtained by means of a formula (15);

$$d_+ = \frac{|(x^T \cdot \omega_+) + b_+|}{d_+}; \quad (15)$$

(2) an Euclidean distance between x and a negative-class hyperplane is obtained by means of a formula (16);

$$d_- = \frac{|(x^T \cdot \omega_-) + b_-|}{d_-}; \quad (16)$$

and (3) which one of $d_+$ and $d_-$ is smaller is determined, where x is in a positive class in response to determining $d_+ < d_-$, and otherwise in a negative class.

In the present disclosure, construction methods are conducted in a linear manner, and under the condition that the methods are used in a nonlinear case, expansion modes of the methods are consistent with that of a parallel support vector machine (SVM); and according to description of a case of two classes, under the condition that the methods are used in a multi-class case, the expansion modes of the methods are consistent with that of the parallel SVM.

Figure 1:
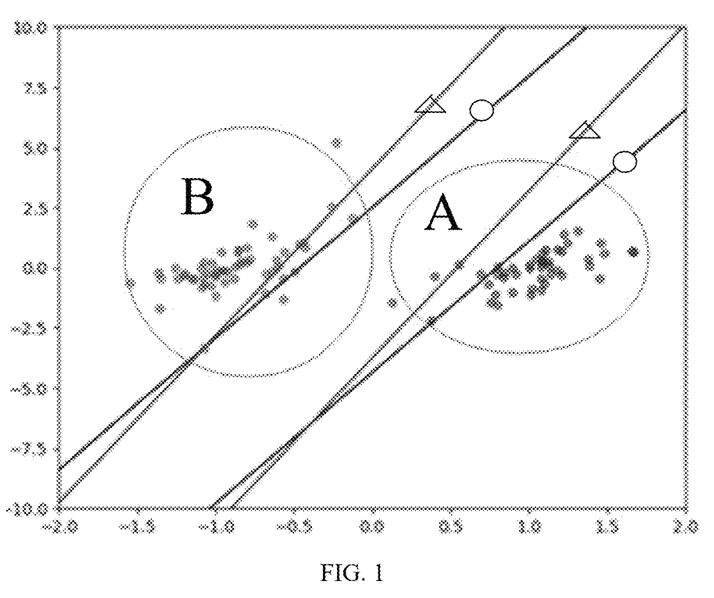
FIG. 1 shows a classification hyperplane of a method of the present disclosure, where origins in part A indicate positive sample points, origins in part B indicate negative sample points, lines with triangles indicate two parallel planes obtained by solving a positive sample optimization problem, and lines with circles indicate two parallel planes obtained by solving a negative sample optimization problem.
Figure 2A:
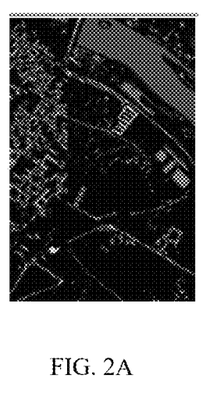
Figure 2B:
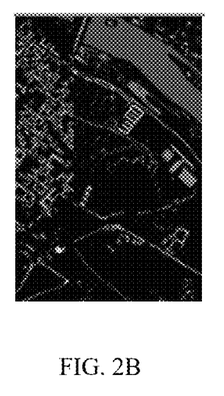
Figure 2C:
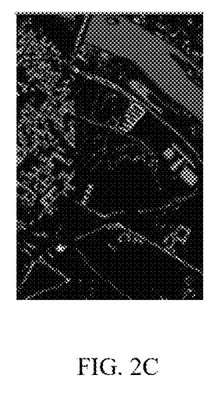
Figure 2D:
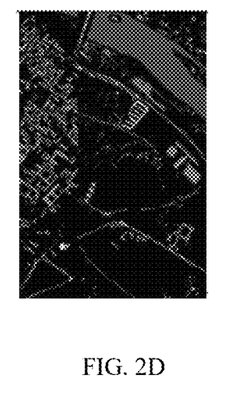
Figure 3A:
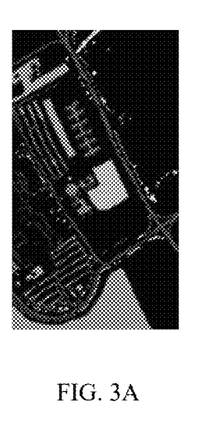
Figure 3B:
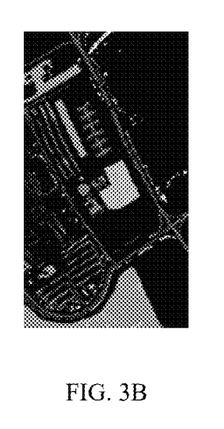
Figure 3C:
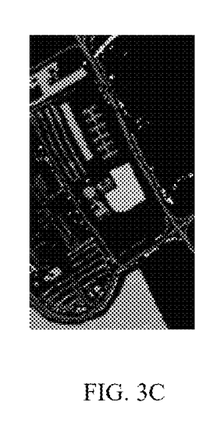
Figure 3D:
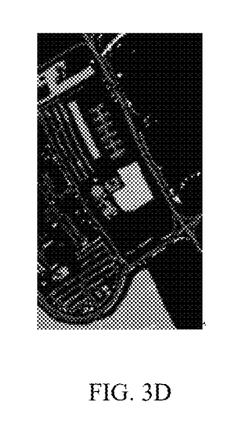

As shown in FIG. 1, each quadratic programming problem may obtain a pair of parallel hyperplanes like SVM, which all shift to corresponding samples. Lines with triangles indicate two parallel planes obtained by solving a positive sample optimization problem, and lines with circles indicate two parallel planes obtained by solving a negative sample optimization problem. In this case, a straight line near a positive sample point and a straight line near a negative sample point are respectively taken as a pair of classification decision hyperplanes of an additional empirical risk minimization nonparallel support vector machine (AERM-NSVM).

To illustrate effectiveness of the present disclosure, the following experimental demonstration is conducted.

1. Pavia Center Data Set

The Pavia Center data set is acquired by Reflective optics system imaging spectrometer (ROSIS) sensor in Pavia, northern Italy. The number of spectral bands in a center of Pavia is 102. The center of Pavia is a 1096×1096 pixel image, which contains 9 classes. A sample division case of a training set test set is shown in Table 1:

TABLE 1

The number of samples of each class of Pavia center scene

| # | Class | Samples | Train | Test |
|---|---|---|---|---|
| 1 | Water | 65971 | 300 | 65671 |
| 2 | Trees | 7598 | 300 | 7298 |
| 3 | Asphalt | 3090 | 300 | 2790 |
| 4 | Self-Blocking Bricks | 2685 | 300 | 2385 |
| 5 | Bitumen | 6584 | 300 | 6284 |
| 6 | Tiles | 9248 | 300 | 8948 |
| 7 | Shadows | 7287 | 300 | 6987 |
| 8 | Meadows | 42826 | 300 | 42526 |
| 9 | Bare Soil | 2863 | 300 | 2563 |

Classification results are shown in FIGS. 2A-2D, and classification accuracy is shown in Table 2.

TABLE 2

Classification results of hyperspectral images of Pavia Center

| Experimental method | SVM | TWSVM | Method of the present disclosure |
|---|---|---|---|
| Test accuracy | 98.33 | 98.25 | 98.50 |
| Kappa | 97.62 | 97.50 | 97.86 |

The Pavia Center data set has a large amount of data, and an equal amount of samples are taken for training. It may be seen from Table 2 that a twin support vector machine (TWSVM) in the Pavia Center data set has a classification result still slightly lower than that of SVM, and has a Kappa coefficient also lower than that of SVM. The method of the present disclosure has classification accuracy exceeding that of a standard SVM, and has a Kappa coefficient higher than that of SVM.

2. Pavia University Data Set

The Pavia University data set is acquired by ROSIS sensor in Pavia, northern Italy. The number of spectral bands in the Pavia University is 103. The Pavia University has a 610×610 pixel, which contains 9 classes. A sample division case of a training set test set is shown in Table 3:

TABLE 3

The number of samples of each class of Pavia University

| # | Class | Samples | Train | Test |
|---|---|---|---|---|
| 1 | Asphalt | 6631 | 300 | 6331 |
| 2 | Meadows | 18649 | 300 | 18349 |
| 3 | Gravel | 2099 | 300 | 1790 |
| 4 | Trees | 3064 | 300 | 2764 |
| 5 | Painted metal sheets | 1345 | 300 | 1045 |
| 6 | Bare Soil | 5029 | 300 | 4729 |
| 7 | Bitumen | 1330 | 300 | 1030 |
| 8 | Self-Blocking Bricks | 3682 | 300 | 3382 |
| 9 | Shadows | 947 | 300 | 647 |

Classification results are shown in FIGS. 3A-3D, and analysis accuracy is shown in Table 4.

TABLE 4

Classification results of hyperspectral images of Pavia University

| Experimental method | SVM | TWSVM | Method of the present disclosure |
|---|---|---|---|
| Test accuracy | 91.49 | 91.53 | 92.43 |
| Kappa | 88.76 | 88.77 | 89.92 |

It may be seen from Table 4 that TWSVM in the Pavia University data set has classification accuracy higher than that of SVM, and has a Kappa coefficient similar to that of SVM, which is more suitable for a case of a nonparallel classification plane. Compared with the standard SVM and TWSVM, the method of the present disclosure has more excellent classification accuracy. The method of the present disclosure has accuracy that is 1.05% higher than that of the standard SVM, and has a Kappa coefficient that is 1.29% higher than that of the SVM. The method of the present disclosure has accuracy that is 0.95% higher than that of the standard SVM, and has a Kappa coefficient that is 1.16% higher than that of the SVM. It is indicated that the method of the present disclosure with structural risk minimization may achieve better results than TWSVM with only empirical risk minimization.

Therefore, through the method for constructing a support vector machine of a nonparallel structure of the present disclosure, a new nonparallel vector machine algorithm is proposed to further improve classification accuracy of hyperspectral images on the basis of the algorithm itself, so as to obtain better classification performance.

Finally, it should be noted that the above embodiments are merely used to describe the technical solution of the present disclosure, rather than limiting the same. Although the present disclosure has been described in detail with reference to the preferred embodiments, those of ordinary skill in the art should understand that the technical solution of the present disclosure may still be modified or equivalently replaced. However, these modifications or equivalent replacement cannot make the modified technical solution deviate from the spirit and scope of the technical solution of the present disclosure.

What is claimed is:

1. A method for constructing a support vector machine of a nonparallel structure, comprising:

S1, preprocessing data, wherein the data is hyperspectral image data, which is collected by a Reflective Optics System Imaging Spectrometer (ROSIS) sensor;

S2, solving a Lagrange multiplier of a positive-class hyperplane based on the preprocessed data;

S3, solving a Lagrange multiplier of a negative-class hyperplane based on the preprocessed data;

S4, solving parameters of the positive-class hyperplane and the negative-class hyperplane based on the solved Lagrange multiplier of the positive-class hyperplane and the solved Lagrange multiplier of the negative-class hyperplane, and constructing a nonparallel support vector machine model based on the solved parameters; and S5, determining a class of a new hyperspectral image data based on the constructed nonparallel support vector machine model;

wherein the preprocessing the data in S1 specifically comprises:

(1) reading m n-dimensional training data sets of two classes, conducting standardization to the n-dimensional training data sets to obtain a training data sample matrix C of m×n, and reading label information as a vector y; wherein the n-dimensional training data sets contain the data;

(2) distinguishing training samples according to positive and negative label information to obtain a matrix A of m×n and a matrix B of m×n; and (3) converting the vector y into a diagonal matrix Y.

2. The method for constructing the support vector machine of the nonparallel structure according to claim 1, wherein the solving the Lagrange multiplier of the positive-class hyperplane based on the preprocessed data in S2 specifically comprises:

(1) constructing a unit vector $I_+$ of $m_+$ dimensions, and obtaining a matrix $P_+$ by means of a formula (1);

$$P_+ = \begin{bmatrix} AA^T + \frac{1}{c_1}I_+ & -AC^TY^T \\ -YCA^T & YCC^TY^T \end{bmatrix} \quad (1)$$

(2) constructing an all-ones vector e of m dimensions, and obtaining a matrix $Q_+$ by means of a formula (2);

$$Q_+ = -e^T \quad (2)$$

(3) constructing a unit matrix I of m dimensions, and obtaining a matrix $H_+$ by means of a formula (3);

$$H_+ = \begin{bmatrix} -1 \times I \\ I \end{bmatrix} \quad (3)$$

(4) obtaining a matrix $J_+$ by means of a formula (4);

$$J_+ = [C_3 \times e^T] \quad (4)$$

(5) constructing an all-ones vector $e_+$ of $m_+$ dimensions, and obtaining a matrix $K_+$ by means of a formula (5);

$$K_+ = \begin{bmatrix} e_+^T \\ -e^T Y^T \end{bmatrix} \quad (5)$$

(6) obtaining vectors $\alpha=(\alpha_1, \ldots, \alpha_m)$ and $\lambda=(\lambda_1, \ldots, \lambda_{m_+})$ of the Lagrange multiplier of the positive-class hyperplane by means of a formula (6);

$$\min_\mu \frac{1}{2}\begin{bmatrix}\lambda^T & \alpha^T\end{bmatrix}^T P_+ \begin{bmatrix}\lambda^T & \alpha^T\end{bmatrix} + Q_+\begin{bmatrix}\lambda^T & \alpha^T\end{bmatrix} \quad (6)$$
$$\text{s.t. } K_+^T\begin{bmatrix}\lambda^T & \alpha^T\end{bmatrix} = 0$$
$$0 \le \begin{bmatrix}\lambda^T & \alpha^T\end{bmatrix} \le J_+, i = 1, \ldots, n$$

when $P_+$ is obtained by Equation (7);

$$P_+ = \begin{bmatrix} AA^T + \frac{1}{c_1}I_+ + E_1 & -(AC^T + E_2)Y^T \\ -Y(CA^T + E_3) & Y(CC^T + E_4)Y^T \end{bmatrix} \quad (7)$$

at this time, obtaining vectors $\alpha=(\alpha_1, \ldots, \alpha_m)$ and $\lambda=(\lambda_1, \ldots, \lambda_{m_+})$ of the Lagrange multiplier of the positive-class hyperplane by means of a formula (8);

$$\min_\mu \frac{1}{2}\begin{bmatrix}\lambda^T & \alpha^T\end{bmatrix}^T P_+ \begin{bmatrix}\lambda^T & \alpha^T\end{bmatrix} + Q_+\begin{bmatrix}\lambda^T & \alpha^T\end{bmatrix} \quad (8)$$
$$\text{s.t. } 0 \le \begin{bmatrix}\lambda^T & \alpha^T\end{bmatrix} \le J_+, i = 1, \ldots, n.$$

3. The method for constructing the support vector machine of the nonparallel structure according to claim 1, wherein the solving the Lagrange multiplier of the negative-class hyperplane based on the preprocessed data in S3 specifically comprises:

(1) constructing a unit matrix $I_-$ of $m_-$ dimensions, and obtaining a matrix $P_-$ by means of a formula (9);

$$P_- = \begin{bmatrix} AA^T + \frac{1}{c_1}I_+ & -AC^T Y^T \\ -YCA^T & YCC^T Y^T \end{bmatrix} \quad (9)$$

(2) constructing an all-ones vector $e$ of $m$ dimensions, and obtaining a matrix $Q_-$ by means of a formula (10);

$$Q_- = -e^T \quad (10)$$

(3) obtaining a matrix $H_-$ by means of a formula (11);

$$H_- = \begin{bmatrix} -1 \times I \\ I \end{bmatrix} \quad (11)$$

(4) obtaining a matrix $J_-$ by means of a formula (12);

$$J_- = [C_4 \times e^T] \quad (12)$$

(5) constructing an all-ones vector $e_-$ of $m_-$ dimensions, and obtaining a matrix $K$ by means of a formula (13);

$$K_- = \begin{bmatrix} e_-^T \\ e^T Y^T \end{bmatrix} \quad (13)$$

(6) obtaining vectors $\theta=(\theta_1, \ldots, \theta_m)$ and $\gamma=(\gamma_1, \ldots, \gamma_{m_-})$ of the Lagrange multiplier of the negative-class hyperplane by means of a formula (14);

$$\min_\mu \frac{1}{2}\begin{bmatrix}\theta^T & \gamma^T\end{bmatrix}^T P_- \begin{bmatrix}\theta^T & \gamma^T\end{bmatrix} + Q_-\begin{bmatrix}\theta^T & \gamma^T\end{bmatrix} \quad (14)$$
$$\text{s.t. } K_-^T\begin{bmatrix}\theta^T & \gamma^T\end{bmatrix} = 0$$
$$0 \le \begin{bmatrix}\theta^T & \gamma^T\end{bmatrix} \le J_-, i = 1, \ldots, n$$

when P is obtained by Equation (15);

$$P_- = \begin{bmatrix} BB^T + \frac{1}{c_2}I_- + F_1 & -(BC^T + F_2)Y^T \\ -Y(CB^T + F_3) & Y(CC^T + F_4)Y^T \end{bmatrix} \quad (15)$$

at this time, obtaining vectors $\theta=(\theta_1, \ldots, \theta_m)$ and $\gamma=(\gamma_1, \ldots, \gamma_{m_-})$ of the Lagrange multiplier of the negative-class hyperplane by means of a formula (16);

$$\min_\mu \frac{1}{2}\begin{bmatrix}\theta^T & \gamma^T\end{bmatrix}^T P_- \begin{bmatrix}\theta^T & \gamma^T\end{bmatrix} + Q_-\begin{bmatrix}\theta^T & \gamma^T\end{bmatrix} \quad (16)$$
$$\text{s.t. } 0 \le \begin{bmatrix}\theta^T & \gamma^T\end{bmatrix} \le J_-, i = 1, \ldots, n.$$

4. The method for constructing the support vector machine of the nonparallel structure according to claim 1, wherein the solving parameters of the positive-class hyperplane and the negative-class hyperplane based on the solved Lagrange multiplier of the positive-class hyperplane and the solved Lagrange multiplier of the negative-class hyperplane in S4 specifically comprises:

(1) obtaining a normal vector $\omega_+$ of the positive-class hyperplane by means of a formula (17);

$$\omega_+ = -A^T\lambda + C^T Y^T\alpha \quad (17)$$

(2) obtaining an offset $b_+$ of the positive-class hyperplane by means of a formula $$b_+ = \frac{e_+^T\left(-A\omega_+ + \frac{1}{c_1}\lambda\right)}{m_+} - 1 \quad (18)$$

(3) obtaining a normal vector $\omega_-$ of the negative-class hyperplane by means of a formula (19);

$$\omega_- = B^T\theta + C^T Y^T\gamma \quad (19)$$

(4) obtaining an offset b of the negative-class hyperplane by means of a formula (20);

$$b_- = \frac{e_-^T\left(-B\omega_- - \frac{1}{c_2}\lambda\right)}{m_-} + 1. \quad (20)$$

5. The method for constructing the support vector machine of the nonparallel structure according to claim 3, wherein when the Lagrange multipliers are obtained by Equation (16), the solving parameters of the positive-class hyperplane and the negative-class hyperplane based on the solved Lagrange multiplier of the positive-class hyperplane and the solved Lagrange multiplier of the negative-class hyperplane in S4 specifically comprises:

(1) obtaining a normal vector $\omega_+$ of the positive-class hyperplane by means of a formula (21);

$$\omega_+ = -A^T\lambda + C^T Y^T \alpha \tag{21}$$

(2) obtaining an offset $b_+$ of the positive-class hyperplane by means of a formula (22);

$$b_+ = -e_+^T \lambda + e^T Y^T \alpha - 1 \tag{22}$$

(3) obtaining a normal vector $\omega_-$ of the negative-class hyperplane by means of a formula (23);

$$\omega_- = B^T\theta + C^T Y^T \gamma \tag{23}$$

(4) obtaining an offset $b_-$ of the negative-class hyperplane by means of a formula (24);

$$b_- = -e_-^T \theta + e^T Y^T \gamma + 1. \tag{24}$$

6. The method for constructing the support vector machine of the nonparallel structure according to claim 1, wherein the determining the class of the new hyperspectral image data based on the constructed nonparallel support vector machine model in S5 specifically comprises:

(1) acquiring test data x, and based on the constructed nonparallel support vector machine model, obtaining an Euclidean distance between x and the positive-class hyperplane by means of a formula (25);

$$d_+ = \frac{|(x^T \cdot \omega_+) + b_+|}{d_+} \tag{25}$$

(2) based on the constructed nonparallel support vector machine model, obtaining an Euclidean distance between x and the negative-class hyperplane by means of a formula (26);

$$d_+ = \frac{|(x^T \cdot \omega_-) + b_-|}{d_-} \tag{26}$$

(3) and based on the constructed nonparallel support vector machine model, determining which one of $d_+$ and $d_-$ is smaller, wherein x is in a positive class in response to determining $d_+ < d_-$, and x is in a negative class in response to determining $d_+ > d_-$.

7. The method for constructing the support vector machine of the nonparallel structure according to claim 1, wherein
the method is conducted in a linear manner, and under a condition that the method is used in a non-linear case, expansion modes of the method are consistent with expansion modes of a parallel support vector machine (SVM); and
according to description of a case of two classes, under a condition that the method is used in a multi-class case, expansion modes of the method are consistent with expansion modes of the parallel SVM.

8. The method for constructing the support vector machine of the nonparallel structure according to claim 2, wherein
the method is conducted in a linear manner, and under a condition that the method is used in a non-linear case, expansion modes of the method are consistent with expansion modes of a parallel support vector machine (SVM); and
according to description of a case of two classes, under a condition that the method is used in a multi-class case, expansion modes of the method are consistent with expansion modes of the parallel SVM.

9. The method for constructing the support vector machine of the nonparallel structure according to claim 3, wherein
the method is conducted in a linear manner, and under a condition that the method is used in a non-linear case, expansion modes of the method are consistent with expansion modes of a parallel support vector machine (SVM); and
according to description of a case of two classes, under a condition that the method is used in a multi-class case, expansion modes of the method are consistent with expansion modes of the parallel SVM.

10. The method for constructing the support vector machine of the nonparallel structure according to claim 4, wherein
the method is conducted in a linear manner, and under a condition that the method is used in a non-linear case, expansion modes of the method are consistent with expansion modes of a parallel support vector machine (SVM); and
according to description of a case of two classes, under a condition that the method is used in a multi-class case, expansion modes of the method are consistent with expansion modes of the parallel SVM.

11. The method for constructing the support vector machine of the nonparallel structure according to claim 5, wherein
the method is conducted in a linear manner, and under a condition that the method is used in a non-linear case, expansion modes of the method are consistent with expansion modes of a parallel support vector machine (SVM); and
according to description of a case of two classes, under a condition that the method is used in a multi-class case, expansion modes of the method are consistent with expansion modes of the parallel SVM.

12. The method for constructing the support vector machine of the nonparallel structure according to claim 6, wherein
the method is conducted in a linear manner, and under a condition that the method is used in a non-linear case, expansion modes of the method are consistent with expansion modes of a parallel support vector machine (SVM); and
according to description of a case of two classes, under a condition that the method is used in a multi-class case, expansion modes of the method are consistent with expansion modes of the parallel SVM.

* * * * *